Patented June 3, 1930

1,761,480

UNITED STATES PATENT OFFICE

WILLIAM LAABS, OF MILWAUKEE, WISCONSIN, ASSIGNOR TO THE ALLBRIGHT-NELL COMPANY, OF CHICAGO, ILLINOIS

RENDERING PROCESS

No Drawing.   Application filed March 20, 1926. Serial No. 96,313.

The present invention relates to processes for rendering fat and oil containing solids of animal origin, and the present application is a continuation in part of my copending application Serial Number 38,809, filed June 22, 1925 now matured into Patent #1,578,245, dated March 23, 1926.

The present application has for its purpose the protection of those forms of my invention disclosed in said application in which the use of subatmospheric pressure is eliminated in the final stage after the materials have been disintegrated and digested with steam pressures above atmospheric pressure, the species in which sub-atmospheric pressure, are used in the final stage having been specifically claimed in my Patent No. 1,578,245 issued on said application.

More particularly the invention relates to improved processes for rendering solids containing fats and oils of animal origin such as edible and inedible animal fats, packing house offal, shop scraps, fish, fish waste, dead animals, table refuse, garbage, and the like.

In the preferred methods of treating materials of the character mentioned as set forth in my above mentioned patent, the materials to be rendered are subjected to disintegrating steam pressures from the moisture contained therein by the application of indirect heat thereto, to melt the fats and oils contained therein and to disintegrate and sterilize the materials being rendered. After the disintegration and sterilization has been completed, the temperatures of the disintegrated materials are reduced below 240 degrees Fahrenheit and preferably below 220 degrees Fahrenheit and the pressures are reduced to subatmospheric. Moisture is removed from the disintegrated materials at the lowered temperatures and subatmospheric pressures until the moisture content of the solid residue or cracklings contained therein goes below 17 percent. The final dehydration is preferably continued until the moisture content of the solid residue is below 15 percent and the moisture content of the solids may be as low as 1 or 2 percent. The use of a vacuum or subatmospheric pressures in the final dehydration stage, while insuring a preservation of the high quality of fats with a minimum of skill and care on the part of the operators is not essential to the successful operation. Where care is used in the operations or the highest quality fats is unimportant, the equipment for developing a vacuum may be eliminated in accordance with the present invention, and the initial cost of installations may be in this manner reduced.

Where hydraulic presses are utilized to express the fats from the solid residue, the moisture content of the solid residue may be higher than is permissible for satisfactory expressing in continuous screw presses and for hydraulic pressing the moisture content of the cracklings may be as high as 20 percent or more. Where the moisture content of the cracklings at the completion of the rendering operation is permitted to run over 17 per cent, the fats will not be seriously harmed by failure to lower the temperature of the materials to below 240 degrees Fahrenheit after the disintegration thereof is completed. While the cracklings may be expressed in a hydraulic press with higher moisture content than can be handled in a continuous press, it is nevertheless desirable to reduce the moisture content of the cracklings or solid residue to below 15 percent and preferably to 10 percent or under for efficient expressing and the manufacture of meal therefrom.

From observations and tests made in the practical application of my invention to various materials high in moisture, it appears that when the moisture content of the total mass to be treated is above the range of 50 percent to 60 percent, a sufficient moisture is present to cause active decomposition of the fats and formation of fatty acids, foaming of the materials, formation of solution of gluey and mucilaginous substances and water soluble substances, and the formation of an emulsified mass from which the moisture can be removed to the desired degree only with difficulty in the final dehydrating stage. The preferred method of handling fat containing materials of high moisture content is to drive off the excess moisture content without causing substantial disintegration until the moisture content of the mass is reduced below the range where decomposition of fats, solution of water soluble content and foaming will occur. In practice it has been found possible to drive the moisture out very rapidly, by permitting steam to escape and limiting pressures to a point no higher than 15 to 20 pounds per square inch upon fresh materials high in moisture, for a period ranging up to an hour or more, to initially reduce the moisture content to the point where the emulsification and foaming is avoided without causing serious disintegration This initial dehyrating stage is preferably continued until the excess moisture is removed though enough moisture remains in the mass to generate the required steam pressures during the disintegrating and sterilizing stages. As in practically all materials the natural moisture content is present in sufficient quantity to cause generation of non-condensible gases from the materials during the beginning of the treatment, and the initial vapors evolved are ordinarily of more or less offensive odors, the vapors are preferably passed through a condenser connected to a sewer, or other convenient means are utilized for disposing of the vapors and gases until the offensive odors no longer appear. Thereafter clean steam will be evolved from the materials which may be used for heating purposes, or for power, or may be vented directly to atmosphere. It will accordingly be seen that the use of subatmospheric pressure in the initial or final dehydration stages may be entirely eliminated.

Accordingly, objects of my invention are to provide improved rendering processes in which the materials may be rendered at high temperatures and under steam pressures developed from the moisture contained therein by the application of indirect heat thereto, and in which relatively high grade fats may be produced in economical manner.

Further objects of the invention will appear in the following detailed description thereof, and are such as may be attained by a utilization of the various steps hereinafter set forth and as more fully defined by the scope of the appended claims.

It will be understood that my improved processes hereinafter set forth may be carried out in the cooker and apparatus set forth in my copending patent numbered 1,578,245 in which the vacuum pump is eliminated and the vacuum line may be connected directly to an atmospheric condenser or to atmosphere in obvious manner. In the following detailed descriptions of carrying out my processes steam pressures given are pressures above atmospheric pressure, in the manner measured in practice on ordinary steam gauges. The operation of the process is varied in details in accordance with the nature of the products to be rendered. The highest grade of products which are rendered in practice are the animal parts from which edible fats and meals fit for human consumption are produced. Such animal parts are high in fat content and have relatively low moisture and solid or meat fiber content. The fat content in such materials ordinarily ranges from 60 to 80 per cent of the total charge but may be as high as 92 percent, the natural moisture content ranges from 5 to 20 per cent, and the remaining solids such as meat fiber and tissue structure will range from 2 to 20 per cent of the total. In handling a charge or batch of this class of material in a cooker, which will handle a batch of 4,000 pounds, the motor is started into operation and the agitators in the cooker are rotated at a speed of from 10 to 25 revolutions per minute. The materials to be rendered are fed into the cooker, preferably in pieces such as are trimmed or cut from the animal carcass. The cooker is preferably filled while cold to the point where the mass rotates as a unit with the agitator shaft although if desired, heating steam may be applied to the jacket as soon as the loading is started. When filled to this extent the material in the initial stages will rub against the interior surface of the cooker and will wipe the surface clean so that a sanitary condition is maintained at all times in the cooker. After the cooker is charged, which will ordinarily consume about 10 to 15 minutes, steam pressures of preferably from 10 to 75 pounds per square inch or more are applied to the cooker jacket, and the charging dome cover is clamped tightly in place. The cooker body is then sealed except for the venting connections. As the moisture content of the total charge of such materials is substantially below 50 percent and the materials are usually fresh, the venting of the moisture may be immediately restricted and the pressures in the cooker permitted to rise. However, even with the highest grade products some decomposition and fermentation will have set in, and in the beginning of the operation, the evolved gases will have a slight offensive odor. These initially evolved gases and the air contained in the cooker are preferably withdrawn from the cooker and condensed or deodorized as by burning or in any suitable manner, until the offensive odors disappear, before permitting the pressures to materially build up in the cooker. When the odors disappear the moisture content of such materials has apparently been lowered to the point where fermentation and active decomposition is arrested and thereafter clean steam is evolved from the mass which may be vented to atmosphere without creating a nuisance or may be used for power or heating purposes. The jacket heat is so applied and the steam generated is vented at such a rate that the pressures in the cooker will reach from 5 to 40 pounds per square inch in the first 15 or 20 minutes after the cooker is closed. Thereafter the generated vapors are continuously withdrawn or vented at such a rate that, the pressure remains at 5 to 40 pounds per square inch until the solids in the materials are reduced to a sticky and more or less disintegrated condition. When this condition is reached the moisture cotent of the cracklings or solid residue in the materials will be above 17 per cent and will be below 35 percent, the major portion of the fats is freed from the solid structure, and the mass is thoroughly sterilized. During the disintegrating period the withdrawal of the vapors in excess of those required to maintain the disintegrating steam pressures removes a substantial portion of the moisture content of the mass and at the same time the disintegration proceeds at controlled temperatures and pressures. The disintegration stage on this type of material is usually completed at the end of from one half to two or more hours with the pressure at 5 to 40 pounds per square inch, according to the product and pressures used, during which time the generated steam in excess of that required for disintegration is continuously withdrawn. As the fats melt out of the solids and the moisture content decreases, the volume of the material will be reduced and the solid structure of the materials is disintegrated by the agitation, and action of the pressures.

After the desired degree of disintegration has been attained, the remaining moisture in the material is removed from the mass to the point where the fats may be expressed from the solid residue free from gluey or mucilaginous substances. The moisture is preferably reduced until the moisture content of the cracklings or solid residue is below 20 percent and preferably in the range of 3 to 15 percent. At the same time the temperatures of the mass are preferably lowered sufficiently to prevent absorption of glues by the fats, discoloration of the fats and destruction of bleachability of the fats, as the moisture content of the solid residue is lowered. While the injury to fats occurs at temperatures above about 220 to 240 degrees Fahrenheit with the moisture content of the cracklings or solid residue below about 16 per cent, a safe margin for variations in the manner of operation and in the nature of the materials should be allowed. If the temperatures are lowered when the solid residue is in the sticky stage, the moisture content of the cracklings, will be above 17 percent and high quality fats will be obtained. The sticky or gummy stage of cracklings or solid residue accordingly marks a good practical point for the reduction of temperatures of the mass. This lowering of the temperatures is accomplished by opening the large vapor line and reducing the internal cooker pressure to atmospheric pressure and at the same time the jacket steam pressures are either cut off entirely or reduced until the jacket temperatures are below 240 degrees and preferably below 220 degrees Fahrenheit. The degree of the removal of moisture by venting in the pressure stage may be continued to such an extent that with the jacket steam supply cut off there will be ample heat in the cooker and materials to drive off the remaining moisture at atmospheric pressures to condition the cracklings for efficient expressing before the temperatures of the materials reach 212 degrees Fahrenheit. The material is agitated and the evolved vapors escape at atmospheric pressure with the temperatures of the material not more than 240 degrees Fahrenheit and preferably below 220 degrees Fahrenheit when the moisture content of the solid residue or cracklings goes below about 17 per cent and the moisture is removed, preferably until the moisture content of the cracklings is less than 15 percent. The rendering operation is then complete and the materials are discharged from the cooker and treated as set forth in my Patent 1,578,245. Where the disintegration is carried out with agitation and with internal steam pressures not exceeding from 5 to 10 pounds per square inch and jacket pressures which will not raise the temperature of the fats above about 220 to 225 degrees Fahrenheit, the pressure stage with proper moisture control in accordance with the principles herein set forth may be continued for two or more hours until the materials are disintegrated. Materials of this kind may be rendered in accordance with my invention without going above temperatures of 220 to 225 degrees Fahrenheit. It will also be understood that where a hydraulic press is utilized the cracklings may be discharged with a moisture content of as high as 25 to 27 percent and pressed.

Materials such as shop fats, market scraps and the like which contain varying amounts of bone, will range ordinarily from 15 to 40 or 50 percent moisture, and from 20 to about 60 percent of fats. This type of material varies widely in character and is ordinarily in a more or less decomposed state when charged into the cooker and the material is preferably washed clean before rendering. The rendering operation is carried out substantially as above set forth, except that the initial venting to remove moisture and gases may be prolonged to remove if desired, moisture in excess of that required for proper disintegration before generating the disintegrating pressures. The cooker pressures are preferably higher in the disintegrating stage and may range as high as 60 pounds per square inch or more inside the cooker, with jacket pressures as high as 100 pounds per square inch or more, to effect the disintegration or reduction of bone content to a mushy digested condition, and the pressures are generally maintained from one to two hours. Because of the higher moisture content of such materials which is frequently around 35% or more, the final atmospheric pressure stage may be lengthened or high jacket pressures and temperatures may be maintained to effect the necessary dehydration of the disintegrated solid residue or cracklings to a moisture content suitable for satisfactory expressing of clear fats from the solid residue after the free fats have been drained away. This stage may range from less than one-half hour to two hours or more depending upon the jacket temperatures. The temperature of the jacket may be reduced to permit the fats to cool in the atmospheric pressure stage to the condition where the fats will not be substantially injured or the jacket temperatures may be kept high and the final atmospheric pressure stage shortened if a higher quantity of fats is not desired.

Dead animals and condemned carcasses ordinarily range from 50 to 60 percent in total moisture content, from about 10 to 20 percent fat content and the remainder solids. In rendering materials of this character, the carcasses are dismembered or disjointed and cut into pieces that will fit into the charging opening. Large pieces such as heads, feet and shin bones and the like can be crushed into smaller pieces, but this is not essential as the disintegration may be effected by the action of the steam pressure in the cooker. Entrails are preferably hashed and washed to remove manure and foreign substances. In treating materials of this character the initial removal of gases is preferably continued until the odors disappear, but as the moisture content is in the range of 50 to 60 percent, pressures may be permitted to rise immediately and the venting may be carried out through the bypass to allow the escape of foul gases. To effect disintegration of this character of material to the desired degree, inside pressures of 35 to 60 or more pounds per square inch and preferably above 40 pounds per square inch are permitted to develop for from two to three hours with jacket pressures of as high as 100 pounds per square inch or more. At the completion of the disintegration the materials are thoroughly sterilized and the solid residue from diseased animal carcasses and decomposed animal parts may be made into stock food without danger of transmitting diseases. The manufacture of sterilized stock food from diseased animal parts is an important and valuable feature of the present invention. After disintegration, the atmospheric pressure stage requires ordinarily from two to three hours at temperatures of 212 to 240 degrees Fahrenheit before the moisture content is lowered to the point where the fats may be continuously expressed substantially free of glues and mucilaginous substances. There is seldom enough fat or oil content in this type of material to have free fat drained away, and at the completion of the dehydration the material in the cooker is usually a dry granular mass or meal.

The usual run of animal tissues and membranes comprising packinghouse offal which goes into the production of inedible fats, such as tripes, pecks, bung gut ends, hog black guts, slunks and the like, range from 60 to 85 percent in moisture content and from 4 to 25 percent in fat. These materials are preferably hashed and washed prior to rendering and will absorb a considerable percentage of moisture in the course of washing. In handling this class of material, the material is agitated and the moisture is withdrawn in the initial stage until the moisture content is reduced below 50 to 60 percent of the total mass prior to causing substantial disintegration of the materials. In practice this material is satisfactorily handled by maintaining jacket pressures of about 70 to 100 pounds substantially throughout all of the operation. For about an hour the steam is removed rapidly enough to prevent the internal pressures from rising to the point where substantial disintegration of the materials will occur. In practice pressures as high as 15 pounds per square inch in this stage with 100 pounds per square inch on the jacket have given excellent results with the excess moisture vented to atmosphere. The escaping vapor is then restricted to permit the internal pressures to rise to 35 or more pounds per square inch for an hour or more after which the internal pressure is then reduced to atmospheric pressure.

Preferred methods of treating inedible animal products may be carried out in the following manner. For low fat products, particularly beef products, such as slunks, pecks, melts, some plucks, beef toes, cow bags, and some tripes, the cooker is loaded cold and full pressure of 80 pounds per square inch or more are applied to the jacket. During about the first 30 minutes the vapors are vented sufficiently to permit internal pressures not higher than 15 pounds to twenty pounds per square inch to be developed. The venting of these vapors is then restricted and in the next fifteen to twenty minutes, pressures of 35 to 45 pounds or more per square inch are permitted to develop in the cooker. The vents are then set so the internal steam pressures will remain constant at 35 pounds or more for a substantial interval and with the vents set in this manner heating is continued until the pressure in the cooker drops to atmospheric pressure which will require about two and one-half hours. When the pressure approaches atmospheric pressure the jacket pressures are reduced and frequent test samples are taken to determine when the dehydration has been completed to the necessary degree.

When handling regular beef offal with a fair amount of fats such as rennets, beef gut ends, bruised fats, condemned beef products, weasands, and the like, the cooker is loaded and pressures up to 80 pounds per square inch or more may be applied to the jacket as rapidly as possible. The cooker may be vented for the first hour in a manner that will cause pressures to build up to from 12 to 20 pounds per square inch and the escape of vapors may then be restricted to build up the pressures to 40 pounds or more per square inch. When the pressures have been built up to the desired value, the excess steam is vented to hold the pressures at the desired value and the heating continued until the desired degree of disintegration is reached and the greater part of the moisture has been removed from the materials. The large vapor outlet is then opened wide and the pressure on the jacket is reduced or cut off. Agitation and removal of the evolved vapors is then continued at atmospheric pressure and frequent samples are taken to determine when the dehydration has been completed to the desired degree. At the completion of the operation the temperature of the fats will be about 225 degrees Fahrenheit or less.

For rendering and treating regular hog inedible products such as black hog guts hashed and washed, with any condemned products or other inedibles, the cooker is loaded, steam pressures of 80 pounds or more per square inch are then applied to the jacket and the evolved vapors are vented for a period of about an hour in a manner permitting internal pressures of about 12 to 15 pounds per square inch to develop. The venting is then restricted until an internal pressure of 35 pounds per square inch is reached, as soon as possible, and the vents are then set to maintain the pressure of 35 pounds per square inch for a substantial interval. With the vent set in this way the heating is continued for a period of about two hours until the internal pressures drop to zero or atmospheric pressure. The steam pressure on the jacket is then substantially reduced and the internal pressures remain at atmospheric pressure.

While specific examples of average approximate moisture and fat contents of various materials have been given, it will be understood that these quantities will vary widely in practice with different materials. It will also be understood that the specific limits of times and pressures are subject to wide variations in the discretion of the operator, and the particular methods of carrying out the invention are to be varied to give the most satisfactory results in accordance with materials to be rendered, and the methods of applying the principles of the invention herein set forth will be varied to meet the particular conditions in the manner found by trial to be most satisfactory, and wide variations may be made by those skilled in the art without departing from the spirit of my invention.

Disintegrating steam pressures ranging up to 100 pounds per square inch or more may be utilized in accordance with the nature of the materials to be rendered, and the time of the disintegrating stage may range up to six hours or more. The time of dehydration after disintegration may range up to four hours or more, and the jacket steam pressures may range from zero or no steam pressure, to 125 pounds per square inch or more during the dehydration stage, depending upon the quality of fats to be produced.

In the foregoing disclosure moisture contents of cracklings or solid residue have been given based on the percentages determined by draining free fats and oils away from the solids and obtaining the percentages without removing the remaining fats and oils from the solid residue.

Summarizing my invention it will be noted that my improved process herein disclosed consists broadly in disintegrating and rendering fat and oil containing solids of animal origin by steam above atmospheric pressure developed from the natural moisture contained therein while controlling the moisture content so that insufficient moisture is present to form an emulsion as the materials disintegrate and free the liquid contents thereof, but sufficient moisture is maintained in the solid structures of the materials to prevent absorption of nitrogenous constituents of the solids by the fats at substantially temperatures above 212° F. After disintegration of the solids and freeing of the fats, the removal of moisture from the solid constituents is continued at temperatures below which injury to the fats occurs by absorption of nitrogenous constituents of the solids as the moisture content of solids goes below approximately seventeen per cent, the final dehydration being carried out at temperatures below 220° F. to 240° F., and preferably at approximately 212° F., and atmospheric pressure.

In treating materials of very high moisture content preliminary moisture elimination of moisture present is effected in a manner to prevent the formation of emulsion as the product breaks down. Preliminary moisture reduction is preferably carried out by an initial dehydrating step, before developing disintegrating steam pressures on the material. Removal of excess moisture prior to or as disintegrating pressures are developed is beneficial in improving the quality of final products and results in lower free fatty acid content in the fats. Preliminary moisture removal is beneficial even where insufficient moisture is initially present to form emulsion because of such beneficial results.

Having described preferred embodiments of my invention, what is desired to be secured by Letters Patent and claimed as new is:

1. In a process of rendering fat and oil containing solids of animal origin, the steps which comprise heating the materials to be rendered sufficiently high while restricting the escape of steam to develop disintegrating steam pressures substantially above atmospheric pressure in the materials from the moisture contained therein, agitating the materials to tumble and grind the same and to aid in the disintegration thereof, and simultaneously removing portions of the moisture therefrom in the form of steam and melting the fats and oils contained in the materials, while maintaining the disintegrating pressures, until the moisture content of the solid residue thereof has been reduced to the range of 17 to 35 percent, thereupon substantially reducing the temperature and lowering the pressure substantially to atmospheric pressure, and continuing the agitation permitting moisture to escape from the materials substantially at atmospheric pressure.

2. In a process of rendering fat and oil containing solids of animal origin, the steps which comprise substantially disintegrating the materials to be rendered and melting the fats and oils contained therein by agitating, tumbling, and heating to temperatures substantially above 212 degress Fahrenheit and continuously removing evolved vapors and steam at a controlled rate permitting disintegrating steam pressures to develop and be maintained therein from the moisture present in the materials whereby substantial disintegration is effected before the moisture content of the solid residue in the materials is reduced to 17 percent, and after disintegration reducing the pressure to atmospheric pressure, continuing the agitation at substantially reduced temperature and continuing the withdrawal of moisture from the materials until the moisture content of the solid residue is reduced to less than 15 percent.

3. In a process of rendering fat and oil containing solids of animal origin, the steps which comprise agitating and heating the materials to be rendered and driving the moisture therefrom without permitting steam pressures higher than 20 pounds per square inch to develop therein until the moisture content thereof is reduced to the point where emulsification of the materials cannot occur as disintegration proceeds; then agitating and heating the materials above 240 degrees Fahrenheit and venting portions of the evolved steam while disintegrating steam pressures substantially above atmospheric pressure are developed in the material from the natural moisture content thereof and maintaining the dsintegrating steam pressures until disintegration of the materials, together with melting of fats and oils contained therein is effected while maintaining the moisture content of the solid residue above 17 percent; and then further agitating and heating the disintegrated material at substantially lower temperature and at atmospheric pressure and continuing the removal of moisture therefrom in the form of vapor until the moisture content of the solid residue is substantially below 17 percent.

4. In a process of rendering fat and oil containing solids of animal origin, the steps which comprise digesting the material to be rendered at temperatures substantially above 212 degrees Fahrenheit and with steam pressures substantially above atmospheric pressure developed from the moisture contained therein to disintegrate the solid structure thereof and to melt the fats and oils contained therein, and continuously maintaining said pressures and removing portions of the moisture therefrom so long as the moisture content of the solid residue is above approximately 17 percent in the solid residue of the materials and not sufficiently high to cause formation of an emulsion of the fats and oils as the materials disintegrate, and thereafter lowering the applied temperature and permitting the escape of further moisture from the disintegrated materials at atmospheric pressure in the form of vapor until the moisture content of the solid residue is reduced to the point where clear fats and oils without mucilaginous substances may be expressed from the solid residue.

5. In a process of rendering fat and oil containing solids of animal origin, the steps which comprise disintegrating the materials to be rendered and melting the fats and oils contained therein by agitating and heating to temperatures above 220 degrees Fahrenheit, whereby disintegrating steam pressures are developed therein from the moisture present in the materials and continuously removing portions of the moisture therefrom in the form of steam while maintaining the disintegrating pressures, and melting the fats and oils contained in the materials until the moisture content of the solid residue thereof has been reduced to the range of 17 to 35 percent, and thereupon substantially lowering the temperature and reducing the pressures to atmospheric pressure, agitating the materials, and removing the moisture therefrom, until the moisture content of the solid residue is reduced substantially below 17 percent.

6. In a process of rendering fat and oil containing solids of animal origin containing moisture, which comprises cooking the material by means of a dry heat while said material is being agitated and thereby causing gradual diffusion of heat throughout the mass of said material and the formation of steam from the moisture contained in the material, permitting the escape of steam formed until the moisture content of the materials is reduced sufficiently so that pressure may be allowed to build up without forming an emulsified mass, retarding the escape of steam and permitting disintegrating steam pressures to develop in the material, maintaining the disintegrating steam pressures in the material while permitting the escape of excess steam generated to further reduce the moisture content, discontinuing the removal of moisture during the maintenance of the disintegrating steam pressures when the moisture content of the solid residue approximates 17 percent, and then after the disintegration is completed discontinuing the cooking to lower the temperature and reducing the pressure to atmosphere and further reducing the moisture content by permitting the escape to atmosphere of the vapor emanating from said hot materials.

7. In a process of dry rendering, fat and oil-containing solids of animal origin containing moisture, which comprises subjecting the material to dry heat in a closed container while said material is being agitated to cause a gradual diffusion of heat throughout the mass of said material and the formation of steam, continuing the application of heat until steam pressure sufficient to disintegrate the material is derived from the moisture contained therein, maintaining the disintegrating steam pressures in the material while permitting the escape of excess steam generated to reduce the moisture content, discontinuing the removal of moisture and the maintenance of the disintegrating steam pressures when the moisture content of the solid residue approximates 17%, and then after the disintegration is completed discontinuing the cooking to lower the temperature and reduce the pressure to atmosphere and further reducing the moisture content by permitting the escape to atmosphere of the vapor emanating from said hot material.

In testimony whereof I affix my signature.
WILLIAM LAABS.